United States Patent Office 2,974,169
Patented Mar. 7, 1961

2,974,169

PARA-AMINO DIPHENYLAMINE

Thomas H. Newby, Middlebury, and Byron A. Hunter, Waterbury, Conn., assignors to United States Rubber Company, New York, N.Y., a corporation of New Jersey No Drawing. Filed Oct. 31, 1957, Ser. No. 693,562

4 Claims. (Cl. 206—576)

This invention is concerned with the manufacture of p-amino diphenylamine. In particular, the invention is concerned with an improved process for the preparation of p-amino diphenylamine from p-nitroso diphenylamine. Specifically, the invention resides in the discovery that p-amino diphenylamine can be obtained in excellent yield and high quality by the interaction of an aqueous solution of an alkali metal salt of p-nitroso diphenylamine and hydrogen in the presence of a hydrogenation catalyst.

In a copending application of Byron A. Hunter and Walter M. Frankenberger, Serial No. 693,526, filed October 31, 1957, now abandoned, it has been shown that p-amino diphenylamine can be prepared by the action of hydrogen on p-nitroso diphenylamine in the presence of a suspending medium and a hydrogenation catalyst. Good yields of high quality p-amino diphenylamine can be obtained by this procedure but the method presents some practical difficulties because of the handling problems that are met with p-nitroso diphenylamine. This latter chemical is normally obtained as a bulky, dusty powder that produces objectionable staining of materials with which it comes in contact. It is particularly objectionable as it comes in contact with the skin and clothing of operators in a chemical manufacturing plant. Additionally, the chemical exhibits severe sternutative effects and presents health hazards to individuals who may come in contact with the material. In short, a practical need is recognized for a modification of the aforementioned process for manufacturing p-amino diphenylamine which will circumvent the difficulties presented above.

It is the purpose of this invention to provide an improved method of manufacturing p-amino diphenylamine from p-nitroso diphenylamine which will avoid the disadvantages and health hazards attributable to the undesirable properties of p-nitroso diphenylamine in the solid state normally obtained. It is also an objective of the invention to provide a direct and economical process for the manufacture of p-amino diphenylamine. Another objective is to provide a method for producing p-amino diphenylamine in a high state of purity and in the absence of contaminating substances which may act as catalyst poisons and function to inhibit any subsequent chemical transformations to which the material might be subjected.

The objectives described are achieved in the practice of the present invention. Advantage is taken of the unique tautomeric character of p-nitroso diphenylamine which permits this substance to exist in the caustic soluble oxime form:

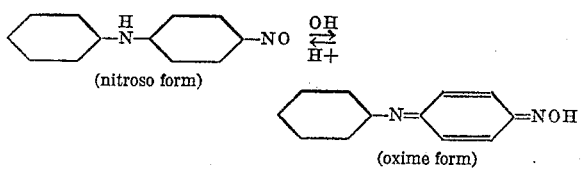

(nitroso form)

(oxime form)

The caustic solubility of the oxime form can be attributed to the acid properties of the oxygen-bound hydrogen atom of the oxime group. In the presence of caustic this hydrogen is replaced by sodium (for example) to produce the metal salt:

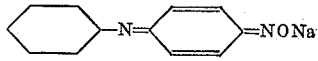

In the practice of the invention the metal salt of p-nitroso diphenylamine is reduced directly with hydrogen in the presence of a hydrogenation catalyst to produce p-amino diphenylamine:

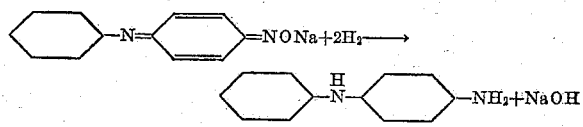

Advantages are attained in the practice of the invention which are of practical and economic value in the manufacture of p-amino diphenylamine. By the preferred mode of the invention it is possible, for example, to use water as a reaction medium which is less costly than other reaction solvents. Additionally, the objectionable handling features and hazardous health problem associated with solid p-nitroso diphenylamine are avoided by the practice of this invention.

The following examples are given to illustrate the invention:

Example 1

An aqueous solution (225 g.) of the sodium salt of p-nitroso diphenylamine (equivalent to 19.8 g. of p-nitroso diphenylamine) and 0.198 g. of palladium on carbon (5% Pd) were introduced into a Parr hydrogenation bottle. Fifty (50) cc. of benzene was added and the mixture was agitated with hydrogen (original pressure 50 lbs. p.s.i.). After 4 hours the take-up of hydrogen had ceased and the color of the mixture had changed from very dark color to a light green. The aqueous layer was removed and the benzene layer was treated with 100 cc. of 6N hydrochloric acid and 300 cc. of water. The resulting mixture was heated on a steam bath to remove the benzene and to bring the hydrochloride of p-amino diphenylamine into solution. The hot solution was filtered from small quantities of insolubles and the solution was then cooled. Caustic solution was added to precipitate the p-amino diphenylamine. The product gradually crystallized. It was filtered, washed and dried. Yield=17 g. of substantially pure p-amino diphenylamine.

Example 2

In a similar experiment the benzene was not included. Hydrogen absorption was less complete. The mixture was worked up by filtering off the solid product (containing p-amino diphenylamine and the catalyst) from the alkaline filtrate. The solid material contained 10.8 g. of p-amino diphenylamine. Neutralization of the alkaline filtrate precipitated 8.0 g. of unchanged p-nitroso diphenylamine.

The incomplete reaction in this case can be attributed to the fact that p-amino diphenylamine coats the catalyst, as it is formed, and finally inhibits the reaction. The benzene included in the first case (Example 1) serves to keep the p-amino diphenylamine in solution and avoids the coating of the catalyst. The amount of benzene should be sufficient to bring the product completely into solution. Instead of benzene, other inert water-insoluble solvents may be used, e.g., toluene, xylene, chlorinated solvents, ligroin, etc., and where the temperatures are below the melting point of p-amino diphenylamine. The same advantage can be attained by conducting the reaction at suitable temperatures above the melting point of p-amino diphenylamine. This latter procedure is illustrated in Example 3.

Example 3

One hundred and ninety-eight (198) g. (1.0 mole) of p-nitroso diphenylamine was converted to a sodium salt by treatment with 44 g. (1.1 moles) of sodium hydroxide (or equivalent amount of potassium hydroxide) in 400 cc. of warm water. This solution was placed in an Aminco bomb with 0.99 g. of palladium on carbon (5% Pd). This amount of catalyst is equivalent to ½% based on the nitroso diphenylamine charged. The bomb was charged with 500 p.s.i. of hydrogen gas and agitated for two hours. Rapid absorption of hydrogen occurred during the first hour and the pressure dropped to 100 p.s.i. It was observed that the reaction was slightly exothermic. The hydrogen pressure was recharged to 500 p.s.i., and the shaking continued for an additional hour as the heat was applied (to 100° C.). Little hydrogen was taken up during the last ¾ hour. The material was removed from the warm bomb. The oily layer soon crystallized on cooling. This was filtered off, washed well with water and dried. Yield of high quality p-amino diphenylamine was 179.4 g. (97%).

Example 4

One hundred and seventy-three (173) g. of an aqueous solution of the sodium salt of p-nitroso diphenylamine (equivalent to 19.8 g. (0.1 mole) of p-nitroso diphenylamine) and 0.198 g. of platinum oxide catalyst were placed in a Parr hydrogenation bottle with 50 cc. of benzene. After purging with hydrogen gas the hydrogen pressure was brought to an initial pressure of 50 lbs. p.s.i. The mix was shaken overnight. The theoretical quantity of hydrogen was absorbed. After filtering off the catalyst, the benzene layer was separated and treated with 100 cc. of 6N hydrochloric acid and with 200 cc. of water. After heating to remove benzene the hot solution was filtered and then made alkaline with sodium (or potassium) hydroxide solution. The product soon crystallized and was filtered off, washed and dried. Yield=18.4 g. of substantially pure p-amino diphenylamine.

Example 5

A solution of potassium salt of p-nitroso diphenylamine was prepared by treating 19.8 g. (0.1 mole) of p-nitroso diphenylamine with 6.2 g. (0.11 mole) of potassium hydroxide in 40 ml. of water. To this solution in a 200 cc. Parr hydrogenation bottle was added 0.1 g. of palladium on carbon (5% Pd) and 50 cc. of xylene. The bottle was affixed to a Parr low pressure hydrogenation apparatus and after purging with hydrogen was charged with 50 p.s.i. of hydrogen gas. The mixture was shaken at room temperature until the take-up of hydrogen was complete. The light green-colored mixture was filtered to remove the catalyst and then treated with 100 cc. of 6N hydrochloric acid and about 500 cc. of water. The mixture was heated to bring the resulting hydrochloride of p-amino diphenylamine into solution and to distill off the xylene. After all the xylene had been removed the solution was filtered from a small quantity of insolubles and the filtrate cooled with ice and made alkaline with caustic solution. The crystalline product was filtered off after standing for several hours and washed and dried. Yield=14.0 g. of substantially pure p-amino diphenylamine.

Other known hydrogenation catalysts, particularly compounds of the platinum metals, of group VIII of the periodic table, may be used including those of nickel and copper. It will be understood that different catalysts will require different operating temperatures.

Temperatures ranging between room temperature, e.g., 20–25° C., and 100° C. may be used. Times will be co-relative with the temperatures.

Having thus described our invention, what we claim and desire to protect by Letters Patent is:

1. In a process of producing p-amino diphenylamine from p-nitroso diphenylamine the improvement which consists in reducing an alkali-metal salt of p-nitroso diphenylamine to p-amino diphenylamine with hydrogen while the said metal salt is dissolved in water, and while agitated with a hydrogenation catalyst.

2. In a process of producing p-amino diphenylamine from p-nitroso diphenylamine the improvement which consists in reducing an alkali-metal salt of p-nitroso diphenylamine to p-amino diphenylamine with hydrogen at a temperature below the melting point of p-amino diphenylamine while the said metal salt is dissolved in water, and in the presence of an amount of an inert water-soluble organic solvent for p-amino diphenylamine sufficient to selectively dissolve formed p-amino diphenylamine.

3. In a process of producing p-amino diphenylamine from p-nitroso diphenylamine the improvement which consists in reducing an alkali-metal salt of p-nitroso diphenylamine to p-amino diphenylamine with hydrogen at a temperature below the melting point of p-amino diphenylamine while the said metal salt is dissolved in water, and in the presence of an amount of an inert water-insoluble organic solvent for p-amino diphenylamine sufficient to selectively dissolve the formed p-amino diphenylamine, separating the organic solvent from the water and the catalyst, and recovering p-amino diphenylamine from the organic solvent by acidifying with hydrochloric acid and then alkalizing the hydrochloride solution to precipitate p-amino diphenylamine.

4. In a process of producing p-amino diphenylamine from p-nitroso diphenylamine the improvement which consists in reducing an alkali-metal salt of p-nitroso diphenylamine to p-amino diphenylamine with hydrogen while the said metal salt is dissolved in water, and while agitated with a hydrogenation catalyst, the agitation being carried out at an elevated temperature above the melting point of the formed p-amino diphenylamine, and subsequently directly recovering the p-amino diphenylamine.

References Cited in the file of this patent

UNITED STATES PATENTS

| | | |
|---|---|---|
| 2,464,044 | Kamlet | Mar. 8, 1949 |
| 2,476,170 | Widiger | July 12, 1949 |
| 2,700,060 | Cherlow et al. | Jan. 18, 1955 |
| 2,734,808 | Biswell | Feb. 14, 1956 |
| 2,811,555 | Larive et al. | Oct. 29, 1957 |

FOREIGN PATENTS

| | | |
|---|---|---|
| 804,113 | Great Britain | Nov. 5, 1958 |

OTHER REFERENCES

Paal et al.: Deutsche Chemische Gesellschaft (Berichte), vol. 63; page 61 relied on (1930).

Whitmore: "Organic Chem.," 2nd ed., page 7 (1951).